Patented Sept. 29, 1936

2,055,806

UNITED STATES PATENT OFFICE 2,055,806

RUBBER TREATING PROCESS AND PRODUCT OBTAINED THEREBY

Robert L. Sibley, Nitro, W. Va., assignor, by mesne assignments, to Monsanto Chemical Company, Wilmington, Del., a corporation of Delaware No Drawing. Application December 29, 1932, Serial No. 649,361

19 Claims. (Cl. 18—53)

The present invention relates to the manufacture of a new and improved rubber product.

In the manufacture of rubber products and particularly hard rubber products, it is very desirable that the articles produced do not permit any of the compounding ingredients or fillers incorporated therein to be removed by contacting therewith as for example by handling. Thus, for example in the case of hard rubber automobile steering wheels as heretofore manufactured, the fillers or vulcanization ingredients employed had a tendency to rub off, when the steering wheels were in use, which greatly hindered the commercial use of articles of this type. Furthermore, it has been found desirable to prepare hard rubber products that are capable of taking a high polish. Heretofore, articles of this class have not been entirely satisfactory.

One object then of the present invention is to provide a hard rubber product which permits intimate contact therewith without any of the fillers or compounding ingredients incorporated therein rubbing off under normal use.

A further object of the present invention is to provide an improved hard rubber product capable of taking a high polish.

Other objects will appear from the detailed description and claims.

The invention consists broadly in compounding and vulcanizing a rubber stock wherein an ester of a rosin acid, as for example abietic acid or an abietic acid-containing rosin, is employed as a vulcanization and compounding ingredient. The invention also resides in the product of the process.

As one example of operating the present invention the following rubber stocks were compounded comprising

| | Stock A | Stock B |
|---|---|---|
| | Parts | Parts |
| Rubber | 80.00 | 80.00 |
| Alpha glycerol abietate | 20.00 | 20.00 |
| Lime | 2.00 | 2.00 |
| Reaction product of three molecular proportions of acetaldehyde and two molecular proportions of aniline | 1.25 | 1.25 |
| Carbon black | 4.00 | 4.00 |
| Sulfur | 26.625 | 26.625 |
| Hard rubber dust | | 16.00 |

The stocks compounded as described were vulcanized by heating in a press for 30 minutes at the temperature produced by 90 pounds of steam pressure per square inch. The rubber product cured as described was found capable of taking a high polish. It furthermore did not exhibit the undesirable properties of hard rubber stocks as heretofore prepared in that intimate contact therewith, as for example when employed in automobile steering wheels, did not cause a gradual rubbing off from the surface thereof of the fillers or vulcanization ingredients incorporated therein.

Furthermore, the new class of esters have been found, when incorporated in rubber, to produce a rubber product resistant to oil penetration. Thus the alpha glyceryl ester of abietic acid was incorporated in a gum stock comprising

| | Parts |
|---|---|
| Rubber | 125.0 |
| Alpha glycerol abietate | 25.0 |
| Zinc oxide | 5.0 |
| Sulfur | 2.0 |
| Diphenyl guanidine | 0.2 |
| Benzoyl benzothiazyl sulfide | 0.8 | and the compounded rubber stock after vulcanizing was found to have markedly decreased the oil penetration thereinto over that of a similar stock containing none of the preferred class of materials.

Further examples of the preferred class of esters that have been incorporated in a rubber stock and found to possess the properties typical of the class comprise B, B' diethyl ether ester of "Solros" rosin, B, B' diethyl ether ester of abietic acid, ethylene diabietate, ethanol abietate, polyglycerol abietate and the ethyl ester of abietic acid.

The examples of the process of the invention and products produced by the process of the invention as hereinbefore set forth are to be understood as specific embodiments of the invention and not as limitations thereof. The present invention is limited solely by the claims attached hereto as a part of the present specification.

What is claimed is:

1. The process of producing a new rubber product which comprises vulcanizing rubber into which has been incorporated prior to the vulcanization thereof more than 10% by weight of an aliphatic ester of abietic acid.

2. The process of producing a new rubber product which comprises vulcanizing rubber into which has been incorporated prior to the vulcanization thereof more than 10% by weight of an aliphatic ester of an abietic acid-containing rosin.

3. As a new product vulcanized rubber into which has been incorporated prior to the vulcanization thereof more than 10% by weight of an aliphatic ester of abietic acid.

4. As a new product vulcanized rubber into which has been incorporated prior to the vulcanization thereof more than 10% by weight of an aliphatic ester of an abietic acid-containing rosin.

5. The process of producing a new hard rubber product capable of being highly polished, which comprises vulcanizing a mixture comprising rubber and a high percentage of sulfur in the presence of an organic accelerator and more than 10% by weight of an aliphatic ester of abietic acid.

6. The process of producing a new hard rubber product capable of being highly polished, which comprises vulcanizing a mixture comprising rubber and a high percentage of sulfur in the presence of an organic accelerator and more than 10% by weight of an aliphatic ester of an abietic acid-containing rosin.

7. The process of producing a new hard rubber product capable of being highly polished, which comprises vulcanizing a mixture comprising rubber and a high percentage of sulfur in the presence of an organic accelerator and a polyglycerol ester of an abietic acid-containing rosin.

8. The process of producing a new hard rubber product capable of being highly polished, which comprises vulcanizing a mixture comprising rubber and a high percentage of sulfur in the presence of an organic accelerator and polyglycerol abietate.

9. The process of producing a new hard rubber product capable of being highly polished, which comprises vulcanizing a mixture comprising rubber and sulfur in the presence of an organic accelerator and alpha glycerol abietate.

10. The process of producing a new hard rubber product capable of being highly polished, which comprises vulcanizing a mixture comprising rubber and a high percentage of sulfur in the presence of an organic accelerator and ethylene diabietate.

11. The process of producing a new rubber product which comprises vulcanizing rubber into which polyglycerol abietate has been incorporated prior to the vulcanization thereof.

12. The process of producing a new rubber product which comprises vulcanizing rubber into which alpha glycerol abietate has been incorporated prior to the vulcanization thereof.

13. The process of producing a new rubber product which comprises vulcanizing rubber into which ethylene diabietate has been incorporated prior to the vulcanization thereof.

14. As a new product vulcanized rubber into which polyglycerol abietate has been incorporated prior to the vulcanization thereof.

15. As a new product vulcanized rubber into which alpha glycerol abietate has been incorporated prior to the vulcanization thereof.

16. As a new product vulcanized rubber into which ethylene diabietate has been incorporated prior to the vulcanization thereof.

17. As a new article of manufacture vulcanized rubber into which has been incorporated prior to the vulcanization thereof substantially more than 10% by weight of an aliphatic ester of a rosin acid.

18. The process of producing a new rubber product which comprises vulcanizing rubber into which has been incorporated prior to the vulcanization thereof substantially more than 10% by weight of one member of a group consisting in alpha glycerol abietate, B, B' diethyl ether ester of rosin, B, B' diethyl ester of abietic acid, ethylene diabietate, ethyl ester of abietic acid, ethanol abietate and polyglycerol abietate.

19. As a new product vulcanized rubber into which has been incorporated prior to the vulcanization thereof substantially more than 10% by weight of one member of a group consisting of alpha glycerol abietate, B,B' diethyl ether ester of rosin, B, B' diethyl ether ester of abietic acid, ethylene diabietate, ethanol abietate, polyglycerol abietate and the ethyl ester of abietic acid.

ROBERT L. SIBLEY.